United States Patent [19]
de Boisseron et al.

[11] Patent Number: 4,930,124
[45] Date of Patent: May 29, 1990

[54] DECENTRALIZED AND SYNCHRONOUS DATA TRANSMISSION PROCESS AND NETWORK

[75] Inventors: Bertrand de Boisseron, Paris; Michel Salvan, Epinay S/Orge; Michèle Gugenhein, Paris, all of France

[73] Assignee: Thomson-CSF, Puteaux, France

[21] Appl. No.: 86,082

[22] Filed: Sep. 21, 1987

[30] Foreign Application Priority Data

Nov. 21, 1985 [WO] PCT Int'l Appl. .............. PCT/FR85/00327

[51] Int. Cl.$^5$ .............................. H04J 3/24; H04J 3/06
[52] U.S. Cl. .................................... 370/94.3; 370/60; 370/54; 370/94.2
[58] Field of Search ................... 370/94, 54, 58, 85, 370/60, 95, 86, 89, 92

[56] References Cited

U.S. PATENT DOCUMENTS

| | | | |
|---|---|---|---|
| 4,399,531 | 8/1983 | Grande et al. | 370/94 |
| 4,516,273 | 5/1985 | Yano | 370/58 |
| 4,532,625 | 7/1985 | Stover | 370/60 |
| 4,627,051 | 12/1986 | Shimizu | 370/86 |
| 4,716,575 | 12/1987 | Douros et al. | 370/86 |
| 4,779,087 | 10/1988 | Fukuda et al. | 370/86 |

Primary Examiner—Douglas W. Olms
Assistant Examiner—Min Jung
Attorney, Agent, or Firm—Oblon, Spivak, McClelland, Maier & Neustadt

[57] ABSTRACT

A process and network are provided for data transmission between a plurality of transmitting/receiving stations, called participants. The network is synchronous and decentralized. The connections between stations are omnidirectional in nature and the communications take place at the same frequency in accordance with a time multiplexing principle. Each of the different participants have one or more predefined transmission times towards one or more participants, also predefined, all of which is within a cycle.

7 Claims, 3 Drawing Sheets

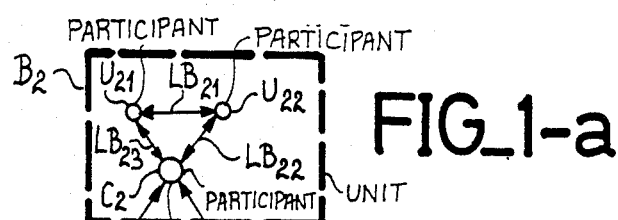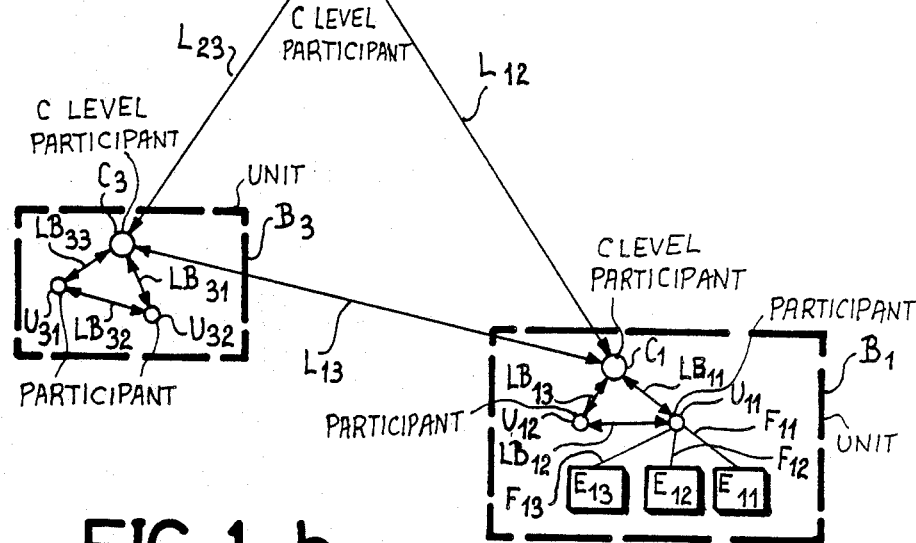
FIG_1-a
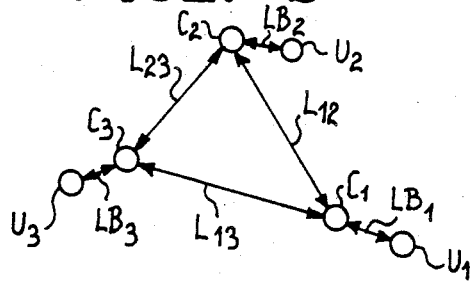
FIG_1-b
FIG_1-c
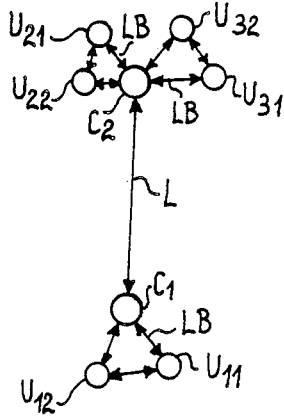
FIG_1-d
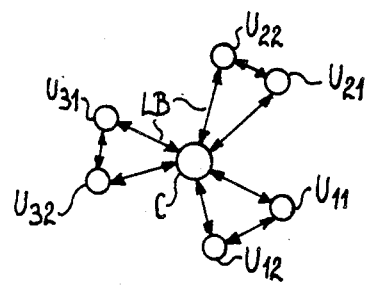

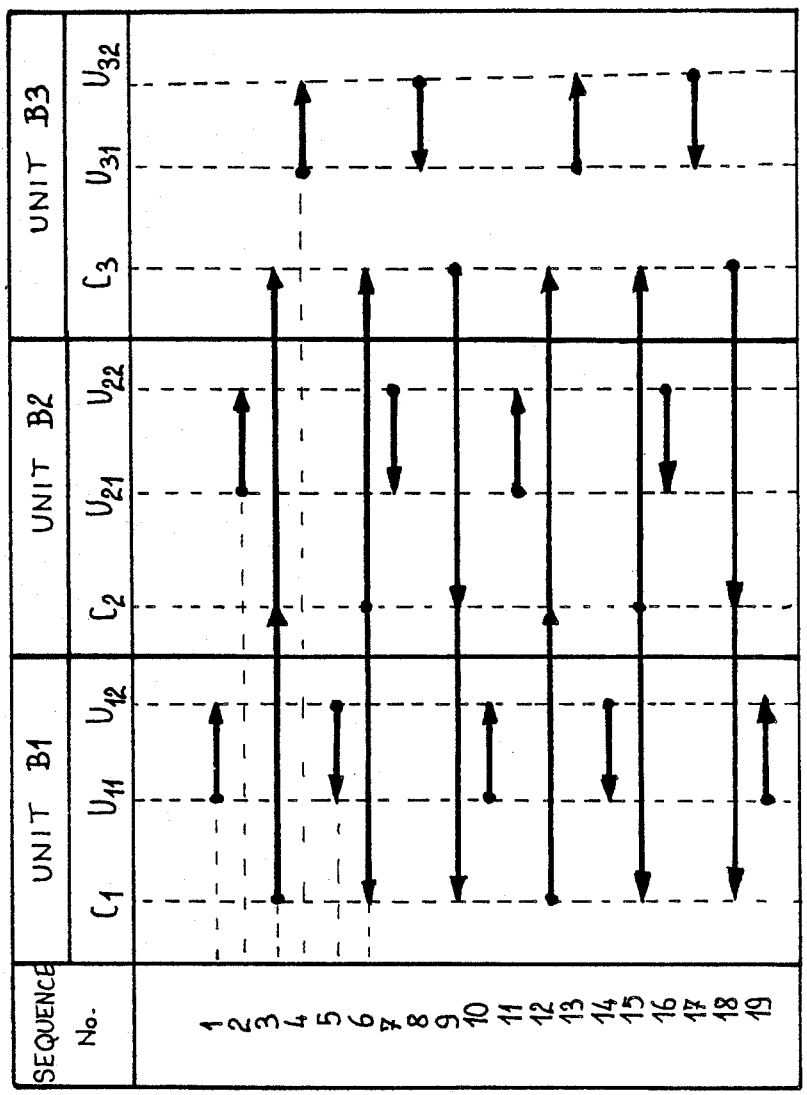
FIG_2

FIG_3
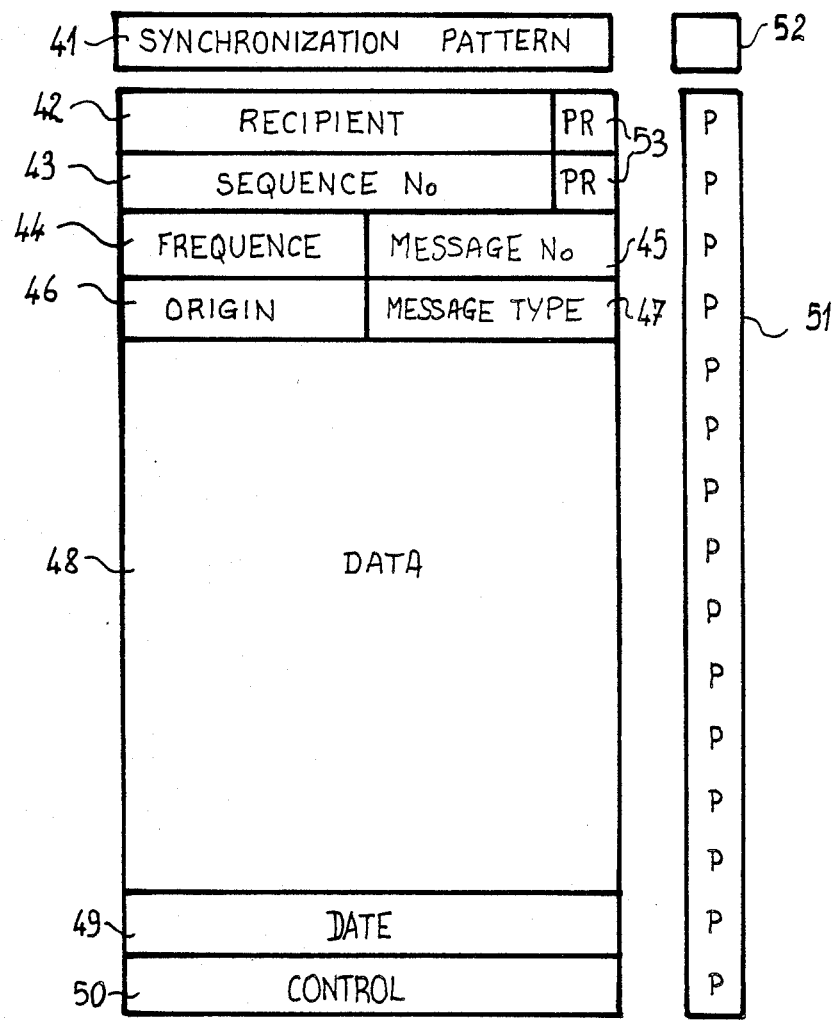

… ……

DECENTRALIZED AND SYNCHRONOUS DATA TRANSMISSION PROCESS AND NETWORK

BACKGROUND OF THE INVENTION

The present invention relates to a process and a network for data transmission between a number of stations capable of transmitting receiving information called "participants", of the decentralized type. When there exists a plurality of fixed or mobile equipments used for the same application, there arises a problem of interconnection of this equipment and, consequently, a problem of controlling the exchanges over the interconnection network, as well as that of the safety of operation of the whole.

It is known to solve these problems by means of a system in which control of the data exchanges is centralized, that is to say that there exists a so called "master" unit which controls the exchanges between the different equipment, generally called "slaves", and which verifies their operation. The disadvantages of such a system are of two kinds: first of all centralization causes a bottle neck limiting the information flow throughout the system; then, a breakdown of the master unit alone results finally in the breakdown of the whole system.

SUMMARY OF THE INVENTION

An object of the present invention is to provide a network for data transmission between different participants which avoids the above mentioned drawbacks through a decentralized control of the exchanges. For this, the connections between two participants are bidirectional and the communications take place at the same frequency in accordance with a time multiplexing principle: the different participants have one or more transmitting time slots predefined within a cycle, the messages thus transmitted being intended for one or more participants. The network is therefore synchronous and decentralized, to the extent that each of the participants has in turn the right to transmit, without there being designation or control by a predefined "master".

More precisely, the invention provides a method of data transmission between a plurality of stations, called participants, capable of emitting and/or receiving data, the data being transmitted by the participants with time multiplexing, each of the participants having a transmission time predefined within a period of time, called cycle; the method further comprises at least one step for the initial synchronization of the participants with each other; finally, prior to the transmission of data, the method comprises a routing step, determining the participant for whom the data to be transmitted is intended as a function of a final destination of this data and of the quality of the connections between participants.

A further object of the invention is a data transmission network using this method.

BRIEF DESCRIPTION OF THE DRAWINGS

Other objects, features and results of the invention will be clear from the following description, given by way of non limitative example and illustrated by the accompanying drawings which show:

FIGS. 1a, 1b, 1c, 1d, different examples of configuration of the network of the invention:

FIG. 2, an example of distributing the transmission time slots between the different participants in the network of the invention;

FIG. 3, an example of a message format used in the network of the invention.

In these different Figures, the same references refer to the same elements.

DESCRIPTION OF THE PREFERRED EMBODIMENTS

In FIG. 1a, a first possible configuration of the network of the invention is shown by way of example.

In this example, the network connects together a certain number of transmitting and receiving stations, called "participants", namely three participants $C_1$, $C_2$ and $C_3$ connected together in a triangle by means of connections referenced respectively $L_{11}$, $L_{23}$, $L_{13}$ and six participants referenced $U_{12}$, $U_{11}$, $U_{21}$, $U_{22}$, $U_{31}$ and $U_{32}$ which are connected together through a participant of type C. The connections connecting the stations together and to a station C are referenced LB, for example $LB_{12}$ connecting together the participants $U_{11}$ and $C_1$, $LB_{12}$ connecting together $U_{11}$ and $U_{12}$ and $LB_{13}$ connecting together $U_{12}$ and $C_1$. Still in this example, each of the participants of type C is connected to two participants of type U so as to form a unit B; thus three units are shown $B_1$, $B_2$, $B_3$ in FIG. 1a.

The connections L and LB are of any type. They are for example short wave links. They are moreover not necessarily of the same type. Each of the participants of type U (and, possibly, the participants of type C) is for example connected to equipment E: in the Figure, station $U_{11}$ is connected to equipment referenced respectively $E_{11}$, $E_{12}$, $E_{13}$, through connections $F_{11}$, $F_{12}$ and $F_{13}$ respectively, which may for example be wired connections. The participants of type U are for example vehicles carrying weapon systems or detection means. Equipment E may be electronic equipment installed in each of the participants U. The participants of type C may be elements, also mobile, for controlling the participants of type U which are attached thereto, the assembly of a participant C and its participants U forming a unit B having complete independence.

FIG. 1b shows another example of configuration of the network of the invention. In this figure, we find again three participants of type C ($C_1$, $C_2$, $C_3$) connected together in a triangle by connections L. To each of participants C is connected for example a single participant U through a connection LB, respectively $U_1$ connected to $C_1$ by $LB_1$, $U_2$ to $C_2$ by $LB_2$ and $U_3$ to $C_3$ by $LB_3$. The participants U and/or the participants C may be connected as before to equipment E.

FIG. 1c shows another network example in which two participants $C_1$ and $C_2$ are connected together by connection L. To participant $C_1$ are connected in a triangle two participants $U_{11}$ and $U_{12}$ by connections LB. To participant $C_2$ are connected two assemblies of participants U: $U_{21}$, $U_{22}$ connected together and to $C_2$ in a triangle, and $U_{31}$, $U_{32}$ connected together and to $C_2$ in a triangle also, by connections LB.

FIG. 1d shows another network variant in which a single participant of type C is connected to three groups of participants of type U. Each of the participants of a group is connected in a triangle to participants C by connections LB as before.

The operation of the network of the invention is described hereafter referring by way of example to FIG. 1a.

As was mentioned above, the connections between participants C and/or U are for example of the Hertzian wave link type (i.e. microwave). They are in this case omnidirectional. They take place at the same frequency with predefined time multiplexing such as shown by way of example in FIG. 2.

In this Figure, a double input table has been shown: horizontally, the different participants grouped in units $B_1$, $B_2$, $B_3$, which are successively transmitter (shown by a small circle), receiver (shown by an arrow) and passive. Vertically, the succession in time of the transmission slots or "sequences" which are numbered.

In the first line of the table has been shown a first step, or sequence number 1, in which it is the participant $U_{11}$ and he alone which has the right to transmit and this for a single other participant, namely $U_{12}$. In the next step (sequence number 2 shown in the bloc 2nd line of the table), the participant $U_{21}$ has alone the right to transmit and this again for a single other particIpant, namely $U_{22}$. In the next step (sequence number 3) it is the participant $C_1$ who has the right to transmit and this for two other participants, namely $C_2$ and $C_3$.

It is thus apparent that the time is divided into sequences (the lines of the preceding table) and, during each sequence, a single participant has the right to transmit for one or more other participants, but in a predefined way both in so far as the transmitting time is concerned and as the address of the recipient or recipients is concerned. A certain number of sequences forms a cycle, which is repeated in time. It is however possible to define several distinct cycles as a function of the roles of the different participants and of the anticipated data flows over the different connections, the type of cycles selected being transmitted to all the participants during initialization of the system.

By way of example, the duration of a sequence is 0.512 ms and a cycle comprises 36 sequences.

FIG. 3 shows one example of the format of the data which are exchanged over a network of the invention.

Referring to FIG. 1a, it can be seen that the data which a participant, such as $U_{11}$ for example, desires to transmit to another participant are supplied to it by equipment E. This equipment supplies, in addition to the useful information or "data", a control word indicating a certain number of service data such as the address of the recipient or recipients, the degree of urgency and/or of importance of the transmission, in particular. The participant $U_{11}$ then shapes these data and this control word, associated with a certain number of auxiliary data so as to form the "message" shown in FIG. 3.

This message has a fixed duration which is less than the duration allowed for a sequence, namely in the preceding numerical example 0.512 ms for the sequence and 0.230 ms for the message. Still with the preceding example, it is in the form of binary data and it is divided into areas numbered 41 to 53 in the Figures.

The message comprises then a first area 41 in which is written a synchronization pattern, formed for example by a PN code of duration equal to that of a byte (8 bits). It is followed by an area 52, comprising a single bit for initializing decoding of the following bits. We then find an area 42 in which the address of the recipient is written for example over seven bits, the last bit of the byte being used for indicating the priority of the message (area 53). This area is followed by an area 43 indicating the number of the sequence considered, again over seven bits, the last bit of the byte being also used for the priority (area 53). The message then comprises, in this embodiment, an area 44 for indicating, if it required what transmission frequency will be used for the following messages, in the case when the frequency to be used is not constant. We then find an area 45 in which the number of the message considered is indicated; in fact, over a given connection, the messages are transmitted and numbered in the order of their transmission by each participant, which allows the recipient to check that all the messages have reached it and to request retransmission if necessary. We then find a zone 46 indicating the address of the participant and possibly of the equipment originating the message. It is followed by an area 47 indicating the type of message: in fact, in this embodiment, the data likely to be transmitted are listed in a certain number of types and a particular format is provided for each type of data. The knowledge of the type thus allows decoding of the data. By way of example areas 44 to 47 occupy two bytes. We then find an area 48 reserved for the data, then an area 49 reserved for dating information, indicating the seniority of the message in the network, thus allowing the data to be updated if required This area 49 occupies for example a byte. The message ends by a sum area 50 in which the sum of each column is worked out for checking purposes (technique known as check sum). Furthermore, a column 51 is isolated formed by a bit placed at the right of each of the preceding bytes, for a parity check of each line.

The operation of such a network begins by an initialization phase in which the following procedure takes place.

In a first step, all the participants are in the listening position. One of the participants, designated by an operator and called original participant, is entrusted with a master function for the initialization, that is to say that it is the first to be able to transmit. It should be noted that any participant could thus be designated. The next step consists in acquiring approximate synchronization. All the participants are therefore listening. Those who receive the transmission from the master synchronize their clock to the reception pulse of the message, in so far as the sequence number is concerned. This synchronization is only approximate for it comprises a systematic error ($\Delta t$) corresponding to the propagation time of the message from the master to the slave participant, i.e. to the distance between the two participants.

For correcting this error, a sharp synchronization step is then carried out which consists for the slave, in sending a message to the master. The master receives this message and finds that it is offset by $\Delta t$ with respect to its own synchronization and, by a new message, informs the slave station of the value of this duration $\Delta t$. On receiving this message, the slave on the one hand corrects its synchronization by $\Delta t$ and, on the other, stores the information concerning the distance which separates it from its master, which it has thus just received.

The synchronization is achieved in this way by degrees between all the participants, the slave synchronized to a master becoming in its turn master for a participant not yet synchronized. As was mentioned above, the network of the invention is of the synchronous type and it is therefore necessary for the different participants to be synchronized with each other and to remain so. In one embodiment, synchronization maintenance is provided so as to prevent a possible drift of the clocks of each of the participants with respect to each other. This maintenance takes place for example in the following way:

each participant is synchronized to each of the messages received from its master in a way similar to the sharp synchronization step described above, that is to say that it is synchronized on the reception pulse of the message, corrected by the stored error, $\Delta$ t;

periodically, the errors $\Delta$ t are up dated with the above described procedure, i.e. by an exchange of specific messages. By way of example, such updating takes place about every second.

When the connection of a slave with its master proves defective in accordance with the criteria defined hereafter, the slave places itself in a phase seeking synchronization with another participant, who then becomes its master.

It should be noted that the notion of master-slave used above is only used for the synchronization of the participants and has no part in the control of the right to transmit. Finally, should the participant originating the initialization stop functioning, that does not cause a final breakdown of the network: in fact, the procedure is resumed in the initialization phase with another participant chosen as master.

The routing of messages from an original participant to a receiving participant takes place in the following way. As was mentioned above, each of the participants carries out parity checks and message number checks on each of the useful messages receives. It uses these checks for forming statistics concerning the quality of each connection which connects it to another participant. There also exist transmission density checks on each connection. In the case where this density is less than a predetermined threshold, the participants concerned transmit filling messages so that the preceding quality statistics may continue to be formed. These quality statistics go back to the station which started initialization of the synchronization procedure. This participant centralizes the different quality data and sends them to each of the participants, each participant then itself calculating the routing of the messages which it sends. When a message leaves an original participant, it takes the optimum path to an intermediate participant, which possibly modifies the path initially chosen depending on updated routing information which it may have received and so on as far as the final destination of the message.

These quality statistics may be exchanged either only in the case of modification, or periodically, for example with a period of the order of a second in the preceding numerical example.

Thus a synchronous decentralized network has been described with time multiplexing, in which each participant has the right to transmit in accordance with predefined sequencing. It has more especially the advantage of being very adaptable to the applications contemplated, because the simple change of sequencing allows the distribution of information over the different connections over the network to be modified.

What is claimed is:

1. A method of data transmission between a plurality of stations, called participants, capable of transmitting and/or receiving data, wherein the data is transmitted by the participants by way of time multiplexing, each of the participants having a predefined transmission time within a period of time called a cycle wherein said cycle is divided into sequences and, for each sequence a single predefined participant may transmit data which is designated to one or more predefined participants; said method comprises at least one step for the initial synchronization of all of the participants with each other and, prior to any transmission of data other than synchronization data, the method further comprises a routing step, determining the participant receiving data information to be transmitted wherein said data information is a function of the final destination of said data information and of the quality of the communication links between participants wherein said quality is based upon prior error counts of said connections.

2. The method as claimed in claim 1, wherein said step for the initial synchronization of the participants with each other takes place based upon one of the participants being designated as an origin, with all of the other participants not taken as the origin receiving data from the participant designated as the origin, being called a participant of the first type and which, synchronize themselves in a first stage, at the reception of a first message transmitted by the origin and then, in a second stage, correcting this synchronization of the actual travel time of a message between the origin and, with the synchronization of any given station, wherein any given station is synchronizing itself at a later time which is determined by the original participant upon the reception of a second message from a participant of the first type.

3. The method as claimed in claim 2, wherein those of the participants, called participants of second type, which are other than the original participants of the first type, who receive the data transmission from a participant of the first type, synchronize themselves to the participants of the first type in the same manner as the original participants, as set forth in claim 3.

4. The method as claimed in claim 3, further comprising:
a step of maintaining the synchronization, for each participant, by synchronizing itself, in the same manner as set forth in claim 3 based upon each message which it receives from the participant who provided said participants initial synchronization, and correcting this synchronization by the actual travel time which it has stored during said stations' initial synchronization.

5. The method as claimed in claim 4, further comprising a step for updating the travel time.

6. The method as claimed in any one of claims 1, 2, 3, 4, or 5, further comprising an additional step:
for compilation by each of the participants, of statistical data concerning the type, number of errors in each of the connections to which each of said participants is connected, followed by a step for transmitting these statistics to the same participant, followed by a step for transmitting these statistics to all of the other participants.

7. The method as claimed in claim 6, wherein the routing step is achieved by consulting a table based upon the simplest path which has been corrected by the quality of link data, elaborated by each participant on reception of the statistics, and giving the best paths between the participants as a function of the quality of the connections.

* * * * *